(12) United States Patent
Verizzo et al.

(10) Patent No.: US 10,049,493 B1
(45) Date of Patent: Aug. 14, 2018

(54) SYSTEM AND METHODS FOR PROVIDING INTERACTION WITH ELEMENTS IN A VIRTUAL ARCHITECTURAL VISUALIZATION

(71) Applicant: HOYT ARCHITECTURE LAB, INC, Sarasota, FL (US)

(72) Inventors: Dorian Verizzo, Sarasota, FL (US); Gary Hoyt, Sarasota, FL (US)

(73) Assignee: Hoyt Architecture Lab, Inc, Sarasota, FL (US)

( * ) Notice: Subject to any disclaimer, the term of this patent is extended or adjusted under 35 U.S.C. 154(b) by 0 days.

(21) Appl. No.: 15/332,978

(22) Filed: Oct. 24, 2016

Related U.S. Application Data

(60) Provisional application No. 62/245,102, filed on Oct. 22, 2015.

(51) Int. Cl.
| | |
|---|---|
| G09G 5/00 | (2006.01) |
| G06T 19/00 | (2011.01) |
| G06T 15/06 | (2011.01) |
| G06T 15/20 | (2011.01) |
| G06T 19/20 | (2011.01) |

(Continued)

(52) U.S. Cl.
CPC ............ G06T 19/003 (2013.01); B64D 47/08 (2013.01); G06T 15/06 (2013.01); G06T 15/20 (2013.01); G06T 17/20 (2013.01); G06T 19/20 (2013.01); H04N 5/23238 (2013.01);
(Continued)

(58) Field of Classification Search
CPC .......... G06K 9/00664–9/00704; G06F 3/0481;
G06F 3/04817; G06F 9/4443; G06F 3/04847; G06F 11/3664; G06F 3/011; G06F 3/012; G06F 3/0304; G06T 19/00;
(Continued)

(56) References Cited

U.S. PATENT DOCUMENTS

| 5,986,670 A | 11/1999 | Dries et al. |
| 7,062,722 B1 * | 6/2006 | Carlin .................... G06Q 30/02 715/781 |

(Continued)

OTHER PUBLICATIONS

Merki; "Product/Now Announcing SceneExplorer"; http://cognitivevr.co/blog/sceneexplored; Sep. 1, 2016; US.

(Continued)

*Primary Examiner* — Todd Buttram
(74) *Attorney, Agent, or Firm* — Malloy & Malloy, PL

(57) ABSTRACT

A method of providing interaction with elements in a virtual architectural visualization includes, providing the architectural visualization comprising a plurality of architectural features, at least one of the architectural features comprising an editable object; providing a heads up display (HUD) visible to a user of the architectural visualization; the editable objects within the visualization having object data associated therewith including at least an object mesh, an object material, and a collision mesh; monitoring a user's field of view via a forward projected vector ray cast from the user's position within the virtual architectural visualization; and, upon interaction by a user with the editable object, prompting the user via the HUD with at least one of an alternative object mesh or an alternative object material, updating the editable object with the user selection, and storing the selection in a computer memory.

3 Claims, 20 Drawing Sheets

US 10,049,493 B1

Page 2

(51) Int. Cl.
*G06T 17/20* (2006.01)
*H04N 5/232* (2006.01)
*B64D 47/08* (2006.01)
*G06F 3/0481* (2013.01)

(52) U.S. Cl.
CPC ...... *G06F 3/04817* (2013.01); *G06T 2210/04* (2013.01); *G06T 2210/21* (2013.01)

(58) Field of Classification Search
CPC ... G06T 17/00; G06T 19/006; G06T 2215/16; H04N 5/272; H04N 2201/3245; A63F 13/10
See application file for complete search history.

(56) References Cited

U.S. PATENT DOCUMENTS

| | | | | |
|---|---|---|---|---|
| 7,139,685 | B2 * | 11/2006 | Bascle | G06F 3/011 |
| | | | | 345/661 |
| 7,277,572 | B2 | 10/2007 | MacLnnes et al. | |
| 9,019,269 | B1 | 4/2015 | Pogue | |
| 9,367,950 | B1 | 6/2016 | Scranton et al. | |
| 9,619,920 | B2 * | 4/2017 | Howell | G06T 15/06 |
| 2002/0133264 | A1 * | 9/2002 | Maiteh | G05B 19/4097 |
| | | | | 700/182 |
| 2005/0289590 | A1 * | 12/2005 | Cheok | G06Q 30/02 |
| | | | | 725/37 |
| 2007/0171221 | A1 * | 7/2007 | Miyamoto | G06T 13/20 |
| | | | | 345/419 |
| 2008/0252640 | A1 | 10/2008 | Williams | |
| 2010/0053151 | A1 * | 3/2010 | Marti | G06F 3/011 |
| | | | | 345/419 |
| 2011/0069173 | A1 * | 3/2011 | Hazzani | G08B 13/19608 |
| | | | | 348/159 |
| 2012/0113015 | A1 * | 5/2012 | Werner | G06F 3/0481 |
| | | | | 345/173 |
| 2012/0116728 | A1 * | 5/2012 | Shear | G06F 17/50 |
| | | | | 703/1 |
| 2012/0310606 | A1 | 12/2012 | Cragg | |
| 2013/0179841 | A1 | 7/2013 | Mutton et al. | |
| 2013/0188059 | A1 * | 7/2013 | Georgeson | G01B 11/24 |
| | | | | 348/169 |
| 2014/0022243 | A1 | 1/2014 | Loberg | |
| 2014/0306886 | A1 * | 10/2014 | Hanawa | G06F 3/011 |
| | | | | 345/156 |
| 2015/0324940 | A1 * | 11/2015 | Samson | G06Q 10/06313 |
| | | | | 705/7.23 |
| 2015/0331576 | A1 * | 11/2015 | Piya | G06F 3/011 |
| | | | | 715/850 |
| 2015/0363967 | A1 * | 12/2015 | Wells | G06T 15/20 |
| | | | | 345/419 |
| 2016/0026253 | A1 * | 1/2016 | Bradski | G02B 27/225 |
| | | | | 345/8 |
| 2016/0077344 | A1 * | 3/2016 | Burns | G02B 27/017 |
| | | | | 345/419 |
| 2017/0063640 | A1 | 3/2017 | Laughlin et al. | |
| 2017/0098312 | A1 * | 4/2017 | Souchard | H04N 5/23293 |
| 2017/0132841 | A1 * | 5/2017 | Morrison | G06T 19/006 |

OTHER PUBLICATIONS

Hoyt Architecture Lab; "Content Detail"; https://www.unrealengine.com/marketplace/hal-archviz-toolkit-v1; Apr. 6, 2016; US.

* cited by examiner

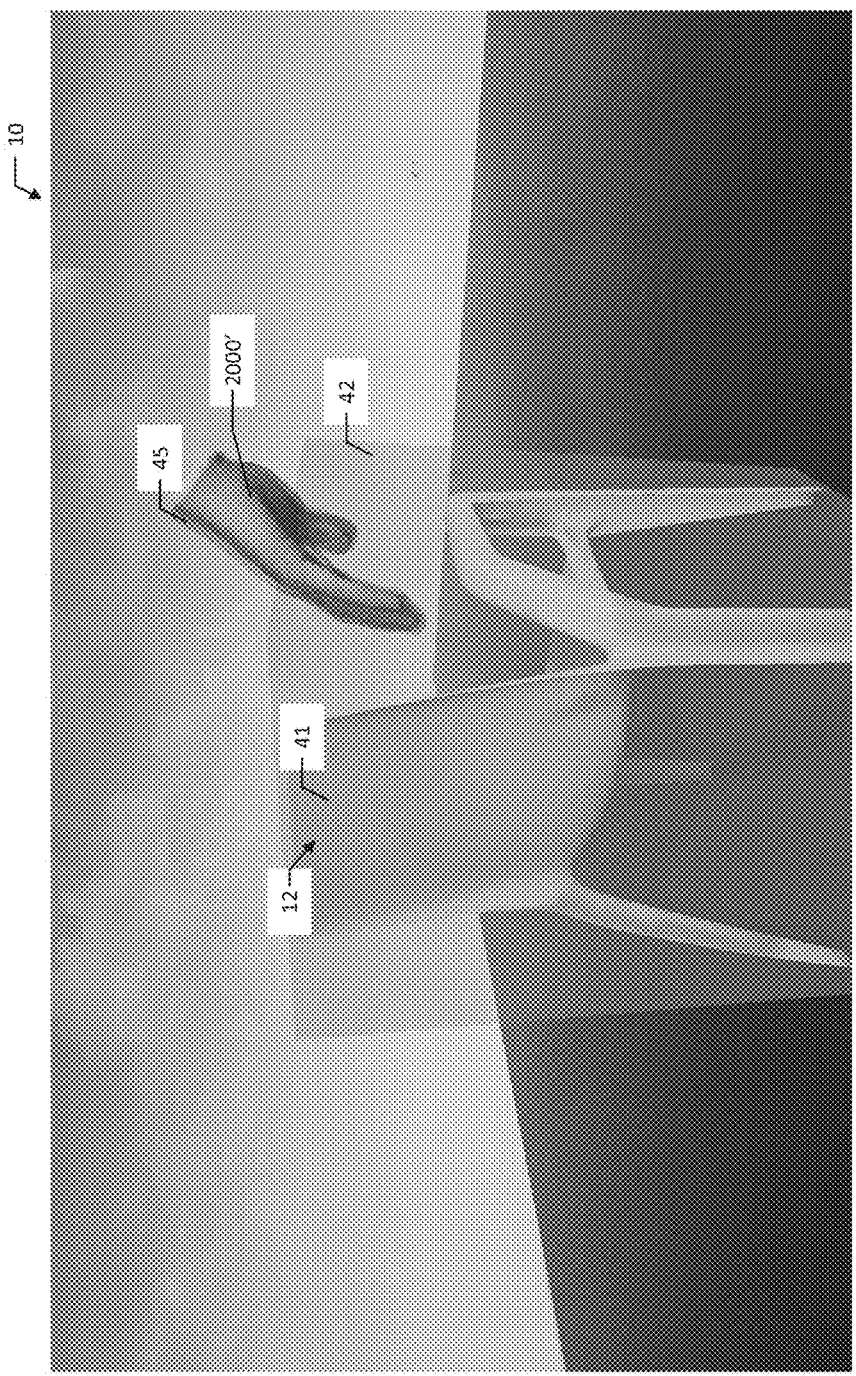

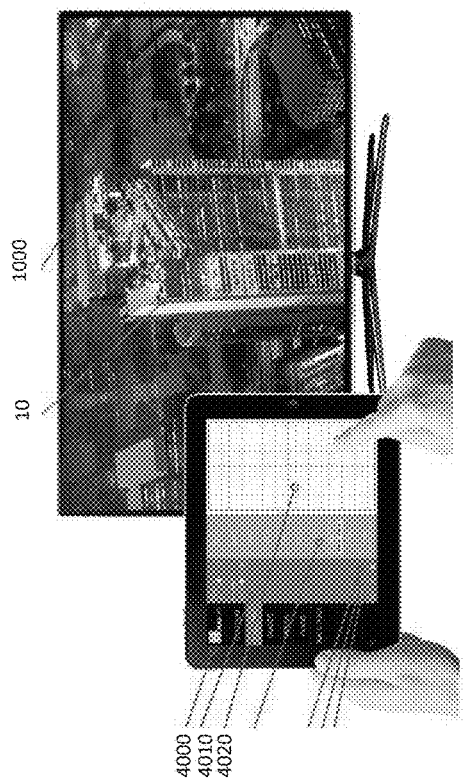
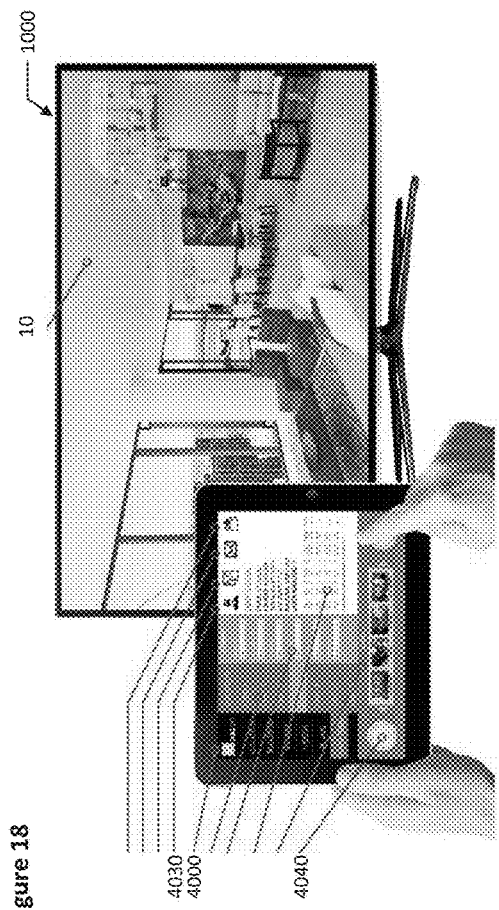

SYSTEM AND METHODS FOR PROVIDING INTERACTION WITH ELEMENTS IN A VIRTUAL ARCHITECTURAL VISUALIZATION

CLAIM OF PRIORITY

The present non-provisional patent application claims priority pursuant to 35 U.S.C. § 119(e) to a prior filed provisional patent application, namely, that having Ser. No. 62/245,102 filed on Oct. 22, 2015, the contents of which is explicitly and fully incorporated herein by reference in its entirety, including all appendices thereto.

APPENDIX OF COMPUTER PROGRAM LISTING ASCII TEXT FILES

An appendix of Computer Program Listing ASCII Text Files is submitted herewith in electronic form via EFS-Web, comprising the following text files, which are explicitly and fully incorporated herein by reference in their entireties:
Name: BP_EditableObject.txt
Date Created: Sep. 3, 2015
File Size: 5,357 KB
Name: BP_ObjectChoices.txt
Date Created: Sep. 3, 2015
File Size: 13 KB
Name:CharacterController-DisableObjectFunction.txt
Date Created: Sep. 3, 2015
File Size: 20 KB
Name:CharacterController-EventGraph.txt
Date Created: Sep. 3, 2015
File Size: 3,092 KB
Name:CharacterController-TraceNewObjectFunction.txt
Date Created: Sep. 3, 2015
File Size: 83 KB
Name:EditableObject-ConstructionScript.txt
Date Created: Sep. 3, 2015
File Size: 159 KB
Name:EditableObject-EventGraph.txt
Date Created: Sep. 3, 2015
File Size: 121 KB
Name: HoytAnalytics (2).txt
Date Created: Sep. 3, 2015
File Size: 1 KB
Name: HoytAnalytics.Build.txt
Date Created: May 12, 2016
File Size: 2 KB
Name: HoytAnalytics.txt
Date Created: May 12, 2016
File Size: 2 KB
Name:HoytAnalyticsEdMode (2).txt
Date Created: May 12, 2016
File Size: 1 KB
Name: HoytAnalyticsEdMode.txt
Date Created: May 12, 2016
File Size: 2 KB
Name: Interpreter.cpp.txt
Date Created: May 12, 2016
File Size: 18 KB
Name: Interpreter.h.txt
Date Created: May 12, 2016
File Size: 4 KB
Name: LevelSelectionWidget.cpp.txt
Date Created: May 12, 2016
File Size: 2 KB
Name: LevelSelectionWidget.h.txt
Date Created: May 12, 2016
File Size: 2 KB
Name: LocatorMap-ContructionScript.txt
Date Created: Sep. 3, 2015
File Size: 44 KB
Name: LocatorMap-EventGraph.txt
Date Created: Sep. 3, 2015
File Size: 60 KB
Name: Recorder.cpp.txt
Date Created: May 12, 2016
File Size: 6 KB
Name: Recorder.h.txt
Date Created: May 12, 2016
File Size: 3 KB
Name: ThumbnailRenderer-ContructionScript.txt
Date Created: Sep. 3, 2015
File Size: 9 KB
Name: ThumbnailRenderer-EventGraph.txt
Date Created: Sep. 3, 2015
File Size: 20 KB
Name: ThumbnailRenderer-FindMatchFunction.txt
Date Created: Sep. 3, 2015
File Size: 33 KB
Name: ThumbnailRenderer-RenderThumbnailFunction.txt
Date Created: Sep. 3, 2015
File Size: 247 KB
Name:HoytAnalyticsEdModeToolkit (2).txt
Date Created: May 12, 2016
File Size: 1 KB
Name:HoytAnalyticsEdModeToolkit.txt
Date Created: May 12, 2016
File Size: 2 KB
Name:HoytAnalyticsEdModeWidget.cpp.txt
Date Created: May 12, 2016
File Size: 10 KB
Name: HoytAnalyticsEdModeWidget.h.txt
Date Created: May 12, 2016
File Size: 2 KB
Name: HoytAnalyticsPrivatePCH.txt
Date Created: May 12, 2016
File Size: 1 KB
Name:HoytAnalyticsRecorder.Build.cs.txt
Date Created: May 12, 2016
File Size: 2 KB
Name: HoytAnalyticsRecorder.cpp.txt
Date Created: May 12, 2016
File Size: 1 KB
Name: HoytAnalyticsRecorder.h.txt
Date Created: May 12, 2016
File Size: 1 KB
Name: HoytAnalyticsRecorderBPLibrary.cpp.txt
Date Created: May 12, 2016
File Size: 1 KB
Name: HoytAnalyticsRecorderBPLibrary.h.txt
Date Created: May 12, 2016
File Size: 3 KB
Name: HoytAnalyticsRecorderPrivatePCH.h.txt
Date Created: May 12, 2016
File Size: 1 KB
Name: HoytSelectionWidget.cpp.txt
Date Created: May 12, 2016
File Size: 1 KB
Name: HoytSelectionWidget.h.txt
Date Created: May 12, 2016
File Size: 2 KB
Name: ToolkitFunctions.txt
Date Created: Sep. 3, 2015

File Size: 104 KB
Name: ToolkitMacros.txt
Date Created: Sep. 3, 2015
File Size: KB
Name: TutorialSystem-EventGraph.txt
Date Created: Sep. 3, 2015
File Size: 907 KB
Name: TutorialSystem-UpdatePanelFunction.txt
Date Created: Sep. 3, 2015
File Size: 13 KB
Name: UI_Edit.txt
Date Created: Sep. 3, 2015
File Size: 5 KB
Name: UI_Main.txt
Date Created: Sep. 3, 2015
File Size: 42 KB
Name: VR_Button.txt
Date Created: Sep. 3, 2015
File Size: 1219 KB
Name: VR_Character.txt
Date Created: Sep. 3, 2015
File Size: 6421 KB
Name: VR_Controller.txt
Date Created: Sep. 3, 2015
File Size: 8 KB
Name: VR_GameMode.txt
Date Created: Sep. 3, 2015
File Size: 9 KB
Name: VR_Interface.txt
Date Created: Sep. 3, 2015
File Size: 54 KB
Name: VR_Panel.txt
Date Created: Sep. 3, 2015
File Size: 10,385 KB
Name: VR_SwitchingPanel.txt
Date Created: Sep. 3, 2015
File Size: 3296 KB

BACKGROUND OF THE INVENTION

Field of the Invention

The present invention is directed to methods, systems, and associated features of providing interaction with elements and objects in a virtual architectural visualization.

Description of the Related Art

Architectural models have long been used to depict, consider, explore, and display architectural concepts prior to construction thereof. In more recent years, three-dimensional computer aided design has been implemented to provide architectural models in a virtual space to provide more rapid and efficient development of such models. However, typically, such computer aided design program can be very complex to operate, suitable for only the most computer-literate. Accordingly, there is a need in the art to provide a more intuitive and user-friendly interface for interacting with elements within an architectural computer model. Additionally, as will be disclosed, the solution provided by the present invention lends itself to tracking and recording various metrics of users navigating an architectural computer model, which the present invention incorporates further to facilitate analytical review of user's interactions within an architectural computer model.

Finally, due to the fact that architectural computer models are generated within a virtual space, selection must normally be made as to the background imagery that will be provided with model, e.g., the environment in which the model is depicted, such as views from interior windows. The present invention also provides a new and inventive solution for accurately recreating proposed background images relative to the building site upon which the architectural model is proposed to be built.

SUMMARY OF THE INVENTION

The present invention is directed to methods, systems, and associated features of providing interaction with elements and objects in a virtual architectural visualization. According to one aspect of the present invention, an architectural visualization is provided for a user to navigate and view utilizing either a display screen and appropriate control elements such as mouse and keyboard or joystick inputs, or via a head-mounted display input device including motion tracking capabilities along with spatially tracked hand input devices which together may comprise virtual, alternate, or mixed reality simulation controls.

A heads-up display (HUD) is provided to a user for interactive and informational purposes to facilitate navigation and viewing of an architectural visualization. Accordingly, the present invention may include an interactive map comprising floor plans and/or a two-dimensional representation of the architectural visualization. The interactive map may include a user icon which tracks the user's movements within the architectural visualization, provides an indication as to the user's directional field of view, and predetermined waypoints or preset camera position markers which are operative to dispose the user's point of view in a preset location and orientation within the visualization, such as those determined by a programmer of the visualization. The interactive map may be further operative to automatically update to reflect when a user has entered a new area such as another floor of the visualization. As such, a floor plan of the associated floor will be represented to the user. Field of view adjustment may also be provided in the HUD which is operative to allow a user to adjust an angle or range of the user's field of view. A preferred embodiment includes an associated camera focal length and measurement in degrees. The HUD also provides toggle controls for viewpoint constraints. By way of example a user's viewpoint may be constrained to that of a first person view within the visualization, but an unconstrained camera view may also be provided such as that which simulates a flying perspective whereby a user may adjust the height of the camera beyond that which could be provided in a first-person perspective.

The HUD may also provide various modes of interaction such as a still image mode in which a camera interface is provided to the user for taking and preserving still images of the visualization which may be stored on a computer associated with or rendering the visualization. An additional mode may comprise a preset camera position mode in which the user may cycle through a plurality of preset camera positions within the visualization.

Another mode of interaction comprises an edit mode in which the user may interact with the visualization by changing any of a plurality of architectural elements or objects in the visualization as well as colors, textures, materials, lighting, background images, and virtually any definable object within the visualization. By way of example various editable objects may be inserted into the visualization via a programming interface and be associated with a plurality of alternative object meshes or object materials, selection of which are operative to change the depicted objects or object materials. Such a method of interacting with such editable objects, especially in embodiments where a head mounted display input device is utilized, may comprise monitoring the user's head motions and field of view via a forward projected vector ray cast from the user's position and locked to the point of view of the user for collision with a collision mesh of an editable object. Generally, it is desirable for the vector ray to be cast normal to the user's field of view. Upon collision, the user may be presented with a plurality of alternative object meshes or alternative object materials from which to select. Alternatively, in embodiments where a spatially tracked hand input device is provided, a hand input device collision mesh may be associated with the hand input device and monitored for collision with the collision mesh of an editable object. As such, editable objects may be interacted with via a simulated "touching" or "grabbing" of the editable object via manipulation of the spatially tracked hand input device.

By way of non-limiting example an editable object may comprise a chair. A plurality of associated alternative object materials may be provided in connection with the chair such as alternative colors, materials, or textures. Additionally, a plurality of associated alternative object meshes may be provided such as alternative furniture, decorations, fixtures, appliances, and the like which may be inserted into the visualization in place of the chair.

In at least one embodiment, when a user desires to interact with an editable object within an edit mode, a graphical panel or swatch panel is presented to the user including thumbnail images of the alternative object meshes or alternative object materials available, from which the user may easily select. Alternative selections are updated in real-time within the visualization and stored to reflect the user's selection.

In a preferred embodiment, the features of the present invention are implemented within a real-time three-dimensional rendering engine such as, but not limited to, a video game engine. In a most preferred embodiment, such a rendering engine may comprise the UNREAL ENGINE 4 developed by EPIC GAMES, INC or UNITY developed by UNITY TECHNOLOGIES. As such, the architectural visualization may be programmed and/or rendered as a "level" of a video game, as intended by the rendering engine, and the various features of the present invention may be implemented via software plugins to be associated with the rendering engine. As such a user of the present invention may experience the architectural visualization as a character within the level. Accordingly, appropriate character controllers and camera controllers may be associated with a custom game mode which is implemented by the engine. The various editable object components, including an automatic thumbnail renderer which operates in association with the alternative object meshes, preset camera position mode, and interactive map elements may be associated with and implemented by the rendering engine. The foregoing is then implemented as an executive by the real time 3D game engine and is experienced by the user as a graphical user interface or HUD.

Accordingly it will be appreciated that a variety of input devices and controllers may be utilized such as a standard display screen and keyboards, mice, game controllers, and/or joysticks. Head-mounted display input devices as well as spatially tracked hand input devices may also be utilized. By way of non-limiting example reference may be had to various commercial embodiments of head-mounted display input devices and spatially tracked hand input devices which may be utilized in association with the present invention such as OCULUS RIFT, HTC VIVE, GOOGLE CARDBOARD, SAMSUNG GEAR VR, PROJECT TANGO, MICROSOFT HOLOLENS, and the like.

Additional features of the present invention include a programming interface which, in a preferred embodiment, is operative within or implemented by the rendering engine. One aspect of the programming interface provides level design with reference to floor maps as textures thereof, from which the architectural visualization may be generated in accordance with the operative tools provided by the rendering engine. Editable objects may be implemented with reference to an object mesh with dictates the visual appearance of the object along with an object material which dictates the color or texture of the object. Alternative object meshes and materials may then be associated with the editable object via a panel interface wherein pre-rendered meshes and materials are loaded to be associated with the editable object. As such when a user interacts with the editable object within an edit mode of the present invention the user will be presented with the aforementioned alternatives that have been associated with the editable object.

Yet another aspect of the present invention includes a thumbnail renderer from which thumbnail pictures of the alternative object meshes and materials may be automatically generated. Such a renderer obviates the need to generate static thumbnail images of each alternative, rather the thumbnail renderer is operative to generate a thumbnail image in real time by referencing the corresponding alternative object mesh or by applying the corresponding alternative object material to a predetermined mesh. These thumbnails are presented to a user of the edit mode in the context of a swatch panel from which the various alternatives may be selected.

A further aspect of the programming interface includes provision of points of interest within the visualization otherwise referred to as preset camera positions. A camera position marker may be placed within the visualization marking the location at which the preset camera position is to be set. The marker may have associated therewith a viewpoint indicator, such as an arrow, which is rotatable or otherwise orientable as the user desires, which will be indicative of the orientation of the preset camera position. As such a user may then provide various camera angles and views that the user desires to be viewed within the visualization.

An additional feature of the present invention comprises methods and implementations of accurate background images for such architectural visualizations. According to one embodiment of the method an aerial vehicle may be utilized and operated in an area of a building site upon which the architectural visualization is intended to represent. The aerial vehicle is equipped with appropriate camera equipment and navigated to a plurality of image capture locations within the building site. Images taken by the camera are then imported into the architectural visualization as accurate depictions of views, for example, from within the interior of a visualization. According to a preferred embodiment of the method, the captured images are manipulated into 360 degree panoramic images and/or image spheres. This may include mapping a plurality of discrete images onto a sphere with normal vectors reversed (facing inward), such that the images face inward. The image(s) are imported into the visualization and oriented with respect to a cardinal direction relative to the visualization. As such a user may be able to select a background image which is representative of a proposed location of the architectural visualization within the building site, by way of example, from the first floor of a northwest facing corner, or from the 15th floor of a southwest facing corner, etc.

The present invention also incorporates methods of capturing analytical data and representing the same in a visual format. As such, a user's movements and field of view is monitored and recorded as the user navigates the visualization at predetermined intervals. The user's movements may be recorded with reference to coordinates or other appropriate position data within the visualization. The field of view of a user may be monitored and recorded with reference to a forward projected vector ray cast from the user's position and associated with an orientation of the user's field of view. This may be accomplished, by way of example, by monitoring an orientation of a head-mounted display unit via accelerometer, gyroscope, or other orientation data provided by the head-mounted display unit. The forward projected vector ray collides with various collision meshes within the visualization and a time period associated with such collision is recorded. As such the length of time that a user views or gazes upon a feature within the visualization is recorded to a computer memory.

An analytic viewer may then be provided in conjunction with the present invention, which in a preferred embodiment is implemented via the rendering engine in a similar fashion to the programming interface. A user is provided with a list of recorded viewings comprising the recorded metrics described above from which the user may select one or more viewings to review. In certain embodiments, data associated with a plurality of viewings may be averaged for review. In such an embodiment, the plurality of viewings may be sorted by one or more desired features such as date or date range of viewing, geographic location of the user, the device type utilized (such as computer, mobile device, or head mounted display unit, along with make and model associated with same), or operating system utilized (such as MICROSOFT WINDOWS, APPLE OS X or iOS, ANDROID, etc. along with version of same). The user may also be presented with data threshold adjustments by which the user may adjust the depiction and presentation of the recorded metrics to fit the user's desired purposes. For example the user may only desire to see data associated with user position encompassing a certain time period, or user camera orientation associated with a certain time period, and may accordingly set a lower threshold limit to such time, in order to ensure that data falling below the threshold does not interfere with representation of the data, thereby clarifying the data for review. Within the analytic viewer, the recorded metrics are overlaid the visualization in the form of user position markers and point of view markers or indicators so that a path of a user through the visualization may be viewed with reference to the user position markers.

The recorded metrics may also be represented in a heat map style presentation. For example, user position markers may have a certain intensity associated with them such as lighter colors representing a relatively short time period spent by a user in a certain location and darker colors representing a longer time spent by a user in a certain location. Similarly, user point of view markers may have a certain intensity associated with them such as lighter colors representing a relatively short time of viewing and darker colors representing a relatively long time viewing. Overlaying the analytic data upon the visualization itself presents a user of the analytic viewer with a clear and easily understandable presentation of the recorded metrics for further analysis and use, because it may be easily noted, for example, which features the user focused on within the visualization, by spending longer periods of time viewing such features and/or within the area of such features.

An additional feature of the present invention comprises an association of a secondary display in controlling relation to a primary display depicting the visualization. In a preferred embodiment, the secondary display comprises a touch screen or a tablet computer. It may be seen that provision of a secondary display may find particular use in connection with presentation of architectural visualizations, for example, in the context of sales of a building construction. In certain embodiments the secondary display may be utilized by a presenter or sales agent while the main display is utilized to present the visualization and other information to a potential purchaser.

As such the secondary display may be pre-configured with appropriate software, such as a mobile application downloadable onto the secondary display, to control and interact with the visualization displayed on the main display. For example a "companion app" may be installed on the secondary display which allows communication and control of a computer running a local instance of the rendering engine and from which the visualization is presented on the main display. The secondary display may then be configured to allow searching and sorting of units within a building construction based on various features, location, price, etc., while the main display is utilized to depict building construction, the location of units within the building construction, and various other features and details relevant thereto.

The secondary display may also include a control surface operative to manipulate the visualization on the main display. The secondary display may also include controls to manipulate ambient lighting, display various amenities associated with the building construction, street names, and other information. The secondary display is also operative to initiate the visualization of a particular unit once the unit is selected. As such, the secondary display may further be provided with navigation controls such as simulated thumb stick controls for navigation within the architectural visualization. The presenter display may also provide controls to enable a head-mounted display unit for use by a prospective purchaser. Other desirable features associated with the secondary display may include the ability to enter and/or record information regarding the prospective purchaser, generate customized brochures for the purchaser, display photographs or videos relative to the building construction, and change background images of the visualization as described in accordance with the method above.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 2B is a depiction of a hand input device collision mesh colliding with a collision mesh of an editable object in accordance with one embodiment of the present invention.

FIG. 18 is a schematic depiction of additional features and elements associated with one embodiment of the present invention.

FIG. 19 is a schematic depiction of additional features and elements associated with one embodiment of the present invention.

Like reference numerals refer to like parts throughout the several views of the drawings.

DETAILED DESCRIPTION OF THE PREFERRED EMBODIMENT

Figure 1:
FIG. 1 is a depiction of a heads up display overlaid an architectural visualization in accordance with on embodiment of the present invention.
Figure 2:
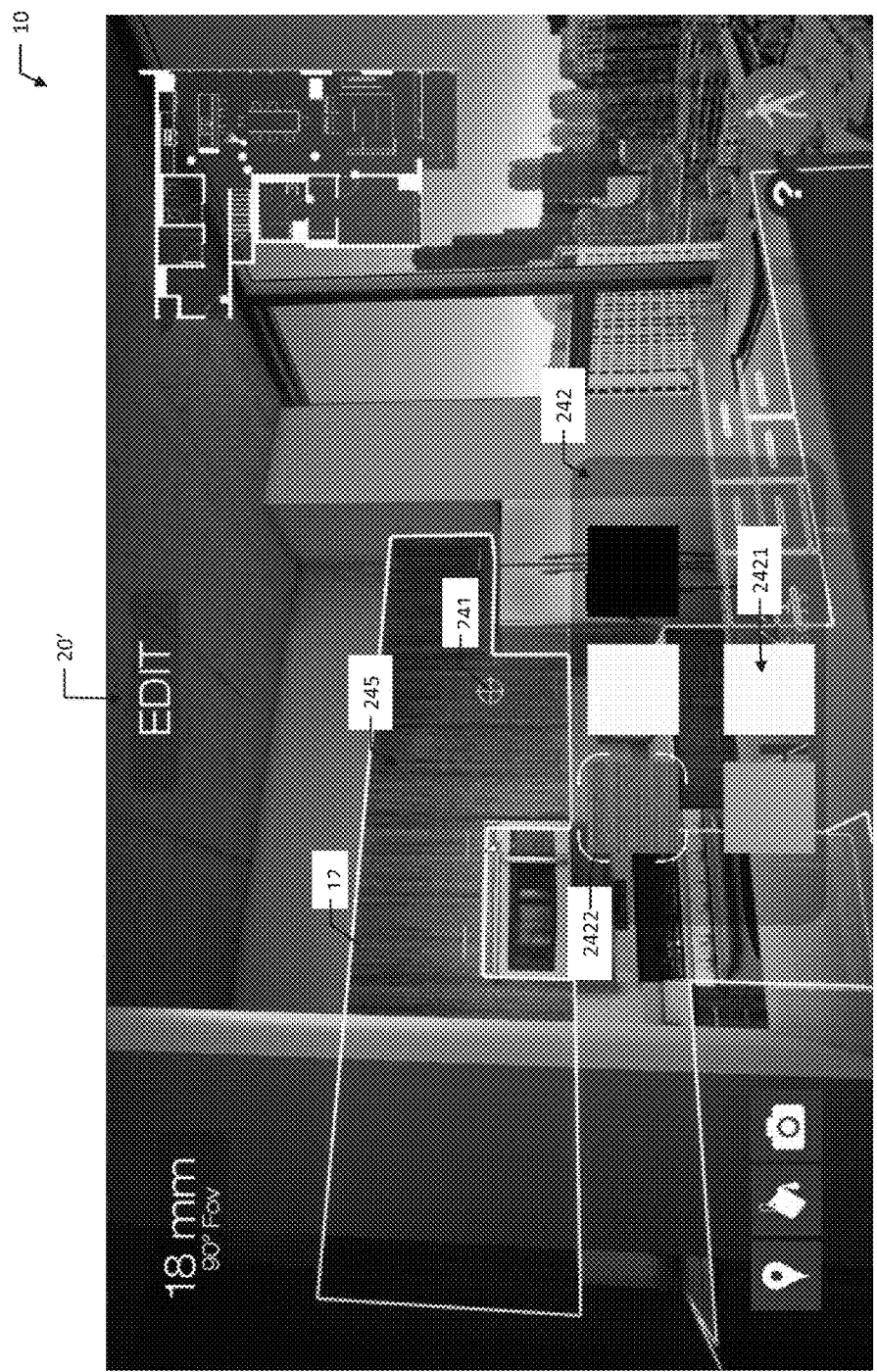
FIG. 2 is a depiction of a heads up display of an edit mode overlaid an architectural visualization and interaction with an editable object thereof in accordance with one embodiment of the present invention.

Referring to FIGS. 1 and 2, depicted therein is an architectural visualization 10 in accordance with one embodiment of the present invention. Within the visualization 10 are various architectural features 11 such as walls, windows, floors, furniture, fixtures, appliances, and the like. At least some of the architectural features are editable objects 12, which will be discussed in detail below. The architectural visualization 10 may also provide a background 13, such as an image which is indicative of a view from the interior of the visualization 10.

The invention provides a heads up display (HUD) 20 including a variety of features overlaid within the visualization 10, such as an interactive map 21, a field of view adjustment (FOV adjustment) 22, and several toggles affecting the various modes of the invention including a pre-set camera position mode 23, an edit mode 24, a still image mode 25, and a viewpoint constraint toggle 26.

The interactive map 21 includes a user icon 210 which tracks the user in real time and denotes the position of the user within the visualization 10, a user field of view (user FOV) 211, which indicates the direction that the user is facing within the visualization 10, and a plurality of interactive pre-set camera position markers 213. When a user selects a marker 213, it is operative to shift the view to a predetermined position within the visualization 10 to a predetermined location and orientation. Such a feature finds particular use when composing particular viewpoints that are desired for a user to view within the visualization 10.

The FOV adjustment 22 provides for manipulation of the user's field of view within the visualization 10 in accordance with familiar metrics of camera focal lengths, (e.g. 35 mm) as well as an indication in degrees of the field of view. Accordingly, a user may select a range dependent upon, e.g., if the user would like to view more of the visualization 10 at once, the user may choose a wide angle, or if the user would like to focus on a portion of the visualization, the user may select a narrow angle.

The pre-set camera position mode 23 allows the user to select a predetermined camera position within the visualization 10 which may correspond to one of the interactive pre-set camera position markers 213 viewable on the interactive map 21. The still image mode 25 allows the user to take still images of the user's FOV and preserve them for later reference.

Now with reference to FIG. 2, the edit mode is disclosed in further detail. Activating the edit mode toggle 24 allows a user to interact with any editable object 12 within the visualization 10. In the depicted embodiment, an edit mode HUD 20' is provided which includes a crosshair 241, or other indicator, to assist in selection and interaction with editable objects 12. Accordingly, a user may manipulate the field of view in order to place the crosshair 241 over an editable object 12. A selected object 245 may, glow, pulse, or be highlighted, to indicate to a user that the object is selected. Upon selecting an object 12, the user is presented with a prompt to select one of an alternative object mesh or object material. In the depicted embodiment, a swatch panel 242 is presented to the user including at least one, or preferably a plurality, of thumbnails 2421 depicting the various alternative objects meshes or object materials available. A selector icon 2422 is provided to indicate which thumbnail 2421 is selected. Once a selection is made, the selected object 245 is updated with either a new object mesh and/or a new object material, depending upon the selection.

Figure 2A:
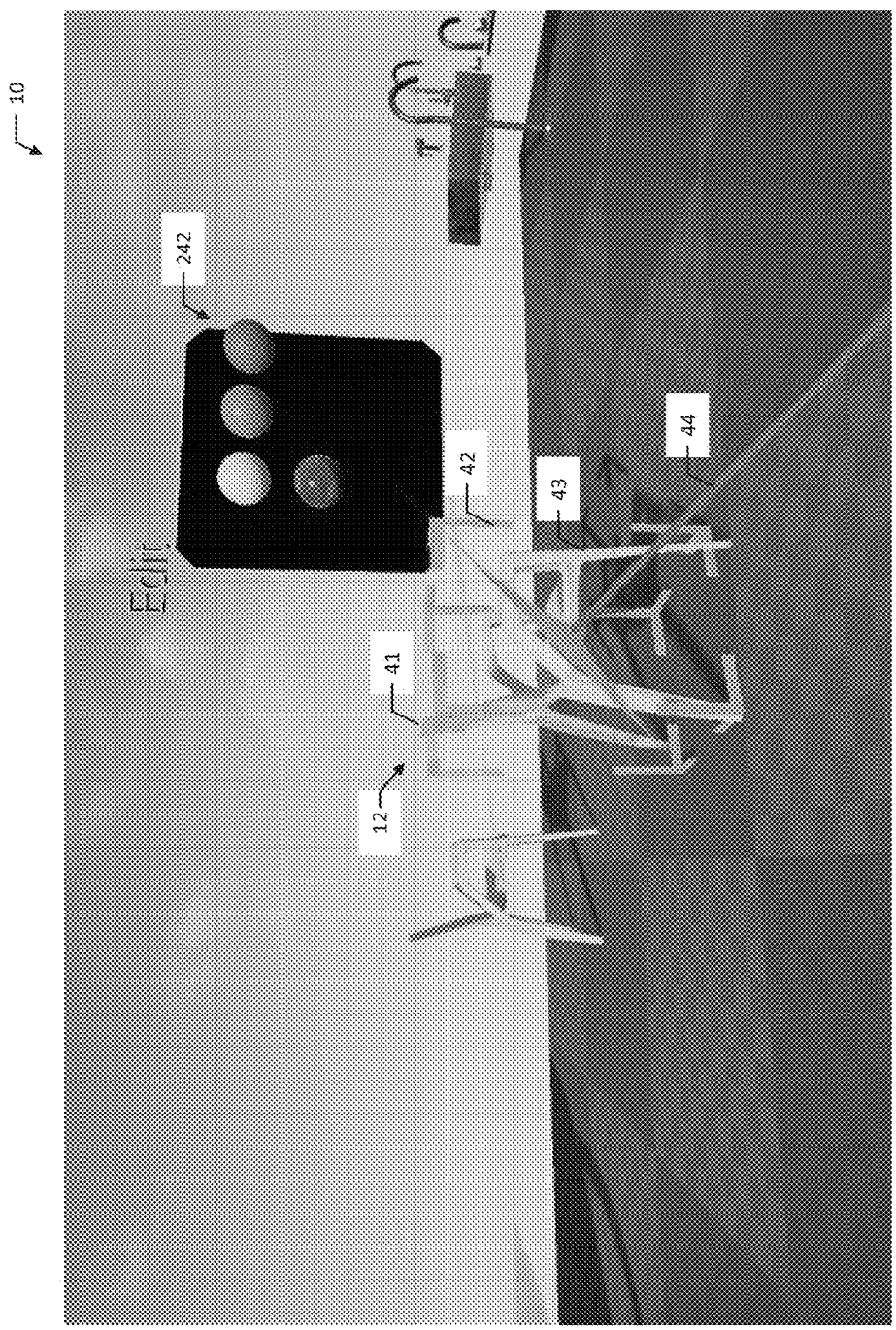
FIG. 2A is a depiction of a forward projected vector ray colliding with a collision mesh of an editable object in accordance with one embodiment of the present invention.

With reference to FIGS. 2A, and 2B, additional functionality relative to the various embodiments of the edit mode of the present invention are depicted. Specifically, each editable item 12 includes an object mesh 41, collision mesh 42, and object material 43. The object mesh 41 generally dictates the visible appearance of the object to a user, e.g., whether the object is in the shape of a chair, cabinets, wall, or any other architectural feature. The object material 43 generally dictates the color and/or texture of the object, e.g., shiny, matte, woodgrain, carpet, etc. The collision mesh 42 is a volume associated with the object, preferably but not necessarily invisible to the user. A forward projected vector ray 44 is cast from the user's position. When a collision is detected between a collision mesh 42 of an editable object 12 and the vector ray 44, the user is presented with certain options relative to the editable object 12, including but not limited to the swatch panel 242 as described above. The vector ray 44 may be visible or invisible to the user. It will be understood that within FIGS. 2A and 2B the vector ray 44 and collision mesh 42 have been depicted as being invisible to facilitate disclosure thereof.

With respect to FIG. 2b, an alternative embodiment is depicted. In such an embodiment, the user of architectural visualization 10 utilizes a spatially tracked hand input device (described further below) to assist in navigating and/or interacting with the visualization 10. Accordingly, a virtual representation of the hand input device 2000' is presented to the user within the visualization 10. The virtual representation of the hand input device 2000' includes a hand input device collision mesh 45 which is a volume associated with the virtual representation of the hand input device 2000'. As such, the user may manipulate the hand input device collision mesh 45 into colliding relation with the collision mesh 42 of the object 12 in order to initiate presentation of certain options relative to the object 12, as described above. In this sense, the user may interact with the object 12 by "touching" or "grabbing" the virtual object in the visualization 10 via manipulation of the spatially tracked hand input device.

Figure 3:
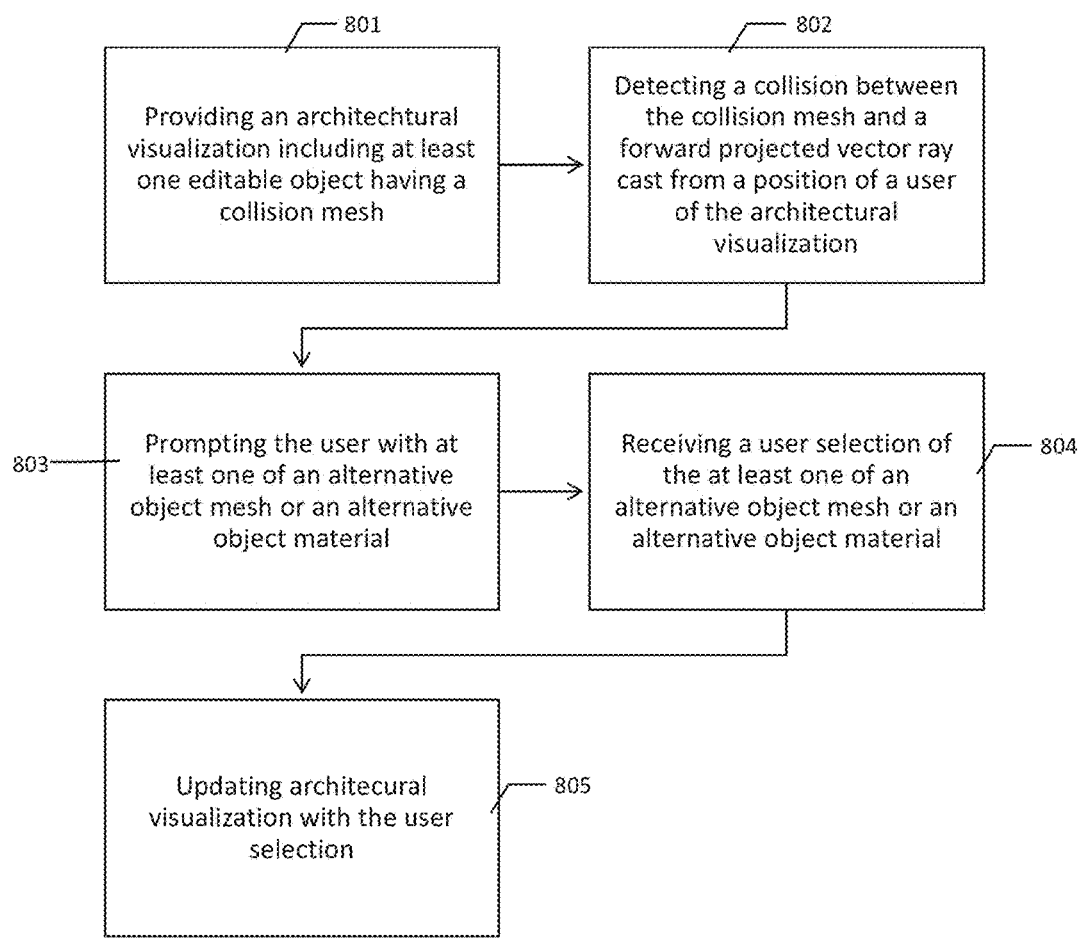
FIG. 3 is a flowchart depicting a method in accordance with one embodiment of the present invention.

FIG. 3 is a flowchart depicting a method of providing interaction with elements in a virtual architectural visualization in accordance with one embodiment of the present invention. As such, the method includes providing an architectural visualization including at least one editable object 801. It will be understood that the architectural visualization may be depicted on virtually any manner of display screen and may be rendered by virtually any manner of graphic rendering software. A preferred embodiment will include a visualization 10 rendered and capable of being displayed on a display screen, such as a computer screen, as well as through a head mounted display input device.

The method also includes detecting a collision between the collision mesh and a forward projected vector ray cast from a position of a user of the architectural visualization 802. The forward projected vector ray may be cast from a virtual camera, such as when a display screen is used to interact with the visualization, or with reference to the orientation of a head mounted display input device worn by a user. In alternative embodiments, the forward projected vector ray may be cast with reference to the orientation of a spatially tracked hand input device. In yet further embodiments the invention may utilize a hand input device collision mesh as described above.

The method also includes prompting the user with at least one of an alternative object mesh or an alternative object material 803. This step may be carried out as described above regarding the presentation of a swatch panel including thumbnails depicting alternative object meshes or alternative object materials. Next the method involves receiving a user selection of the at least one of an alternative object mesh or an alternative object material as previously described regarding selection by a user of a thumbnail present in a presented swatch panel. Next the method involves updating the architectural visualization with the user selection 805. Accordingly the editable object within the visualization will depict the selected object mesh or object material. These selections may also be stored in a memory of a computer associated with the architectural visualization.

Figure 4:
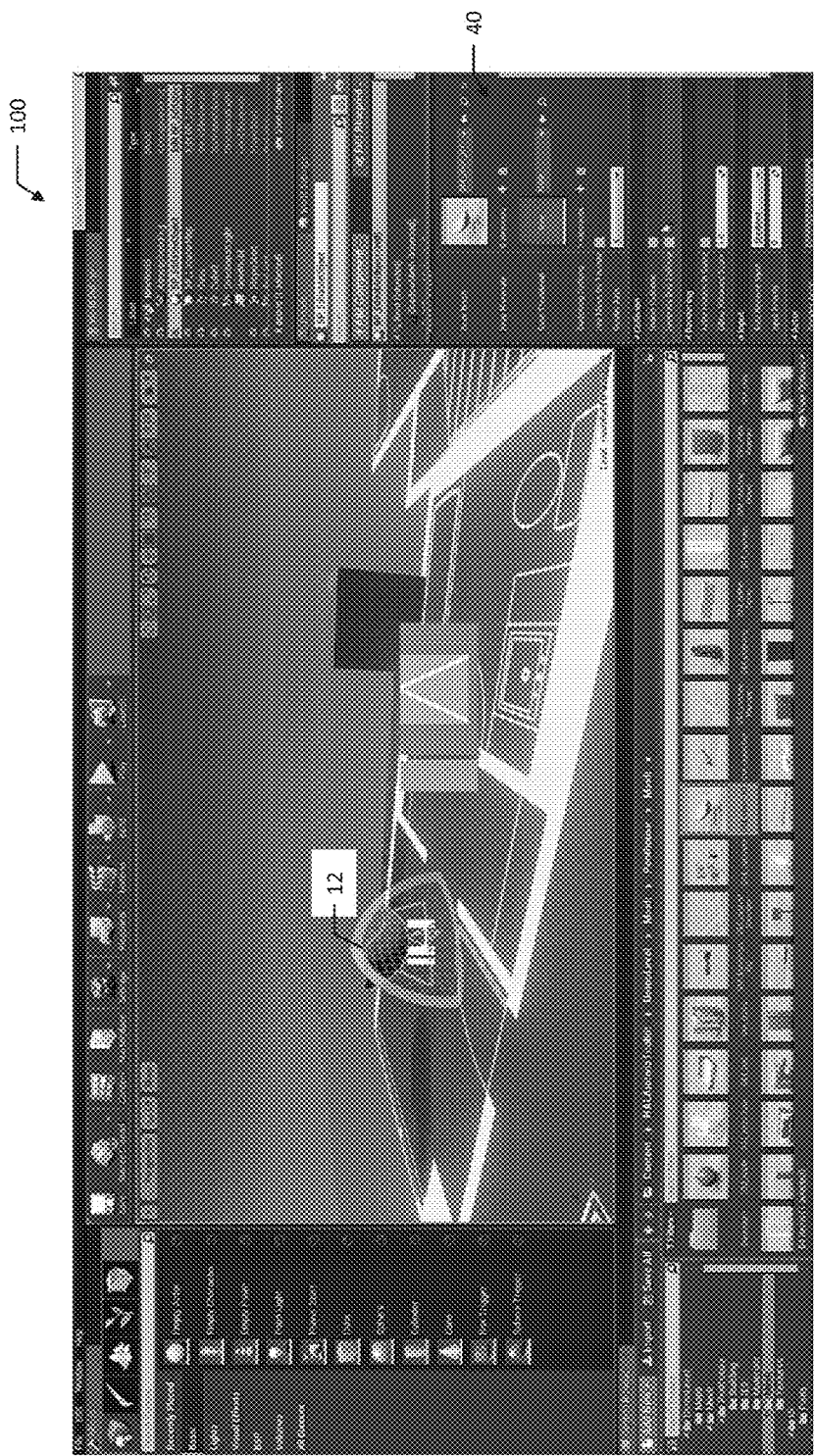
FIG. 4 is a depiction of a programming interface and associated features in accordance with one embodiment of the present invention.
Figure 5:
FIG. 5 is a depiction of a programming interface and associated features in accordance with one embodiment of the present invention.
Figure 6:
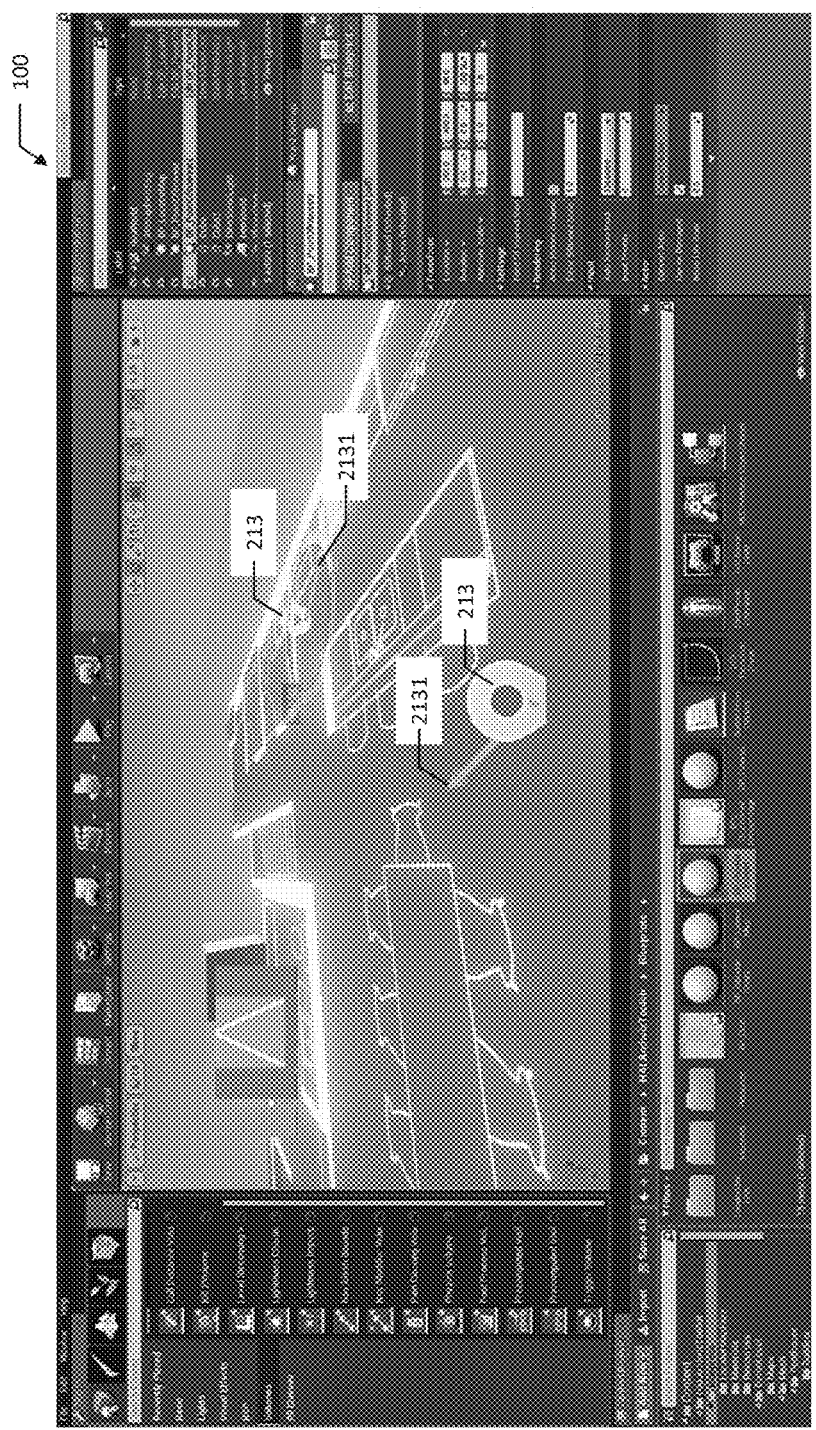
FIG. 6 is a depiction of a programming interface and associated features in accordance with one embodiment of the present invention.

FIGS. 4, 5, and 6 depict a programming interface 100 in accordance with one embodiment of the present invention. Specifically with reference to FIG. 4, depicted therein is an editable object 12 and object data panel 40 for providing alternative options associated with the object 12. As can be seen in FIG. 5 an alternative object mesh 243 has been associated with the editable object 12, additionally an alternative object material has been associated with the editable object 12. As depicted the editable object 12 comprises a chair, while the alternative object mesh 243 comprises a set of cabinets, and the alternative object material 244 is a shiny, dark material. When a user of the visualization 10 interacts with the editable object 12 the user will be presented with an alternative object mesh 243 in the form of the cabinets or an alternative object material 244 which will be operative to present the chair in a shiny, dark texture.

Turning to FIG. 6, the programming interface 100 may also include interactive preset camera position markers 213 positionable by a user of the programming interface 100. Each marker 213 includes a viewpoint indicator 2131. The indicator 2131 is selectively positionable and/or rotatable by a user of the programming interface 100 and is indicative of the preset camera orientation associated with the marker 213. Accordingly a user of the architectural visualization 10 including such markers 213 will be able to interact with the markers 213 which are operative to position the viewpoint of the user in accordance with the preset camera position marker 213 in the orientation determined by the position of the indicator 2131.

Figure 7:
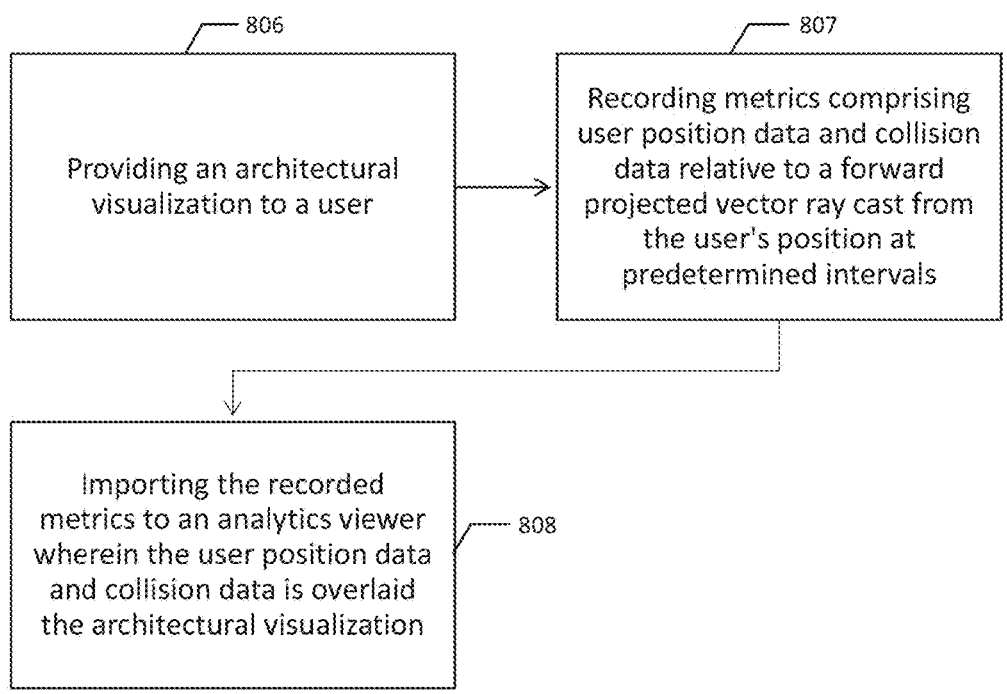
FIG. 7 is a flowchart depicting another method in accordance with one embodiment of the present invention.

FIGS. 7 through 10 are associated with a method of producing and representing analytic data within a virtual architectural visualization. Specifically, FIG. 7 is a flow chart in accordance with such a method which includes providing an architectural visualization to a user 806, essentially described above. The method further includes recording metrics comprising user position data and collision data relative to a forward projected vector ray cast from the user's position at predetermined intervals 807. User position data may comprise measurements associated with the position of the user within the architectural visualization. Collision data may comprise measurements associated with a field of view of the user such that objects within the visualization that the user views may be tracked. One embodiment includes a forward projected vector ray cast from the user's position and specifically with reference to the user's field of view, tracking, and recording collision data associated with collisions of the vector ray and collision meshes of objects within the architectural visualization. It will be understood that a range of predetermined intervals at which such metrics are recorded may be applicable depending upon the metrics to be collected and/or features of the architectural visualization. In a preferred embodiment of the present invention however the predetermined interval is on the order of ¼ of a second which the inventors have determined to be an optimal interval for collection of analytic data based upon a user's movements and viewings within and architectural environments such as the interior of a building.

The method additionally includes importing the reported metrics to an analytics viewer wherein the position data and collision data is overlaid the architectural visualization 808. As such the raw data comprising the recorded metrics, which may be coordinates relative to user position and time measurements relative to length of collisions between the forward projected vector ray and collision meshes, is synthesized into an easily viewable and understandable format. For example the user position and data may be represented by one or more position markers distributed throughout the visualization representing a path that the user navigated within the visualization during a certain viewing. Additionally the collision data may be represented as point of view markers positioned at the location of collisions between the forward projected vector ray and corresponding collision meshes. Additionally the position markers may have a position intensity associated with them, such as variable opacities and/or colors which indicate a length of time that a user was spent in a certain location within the visualization. For example if a user moved relatively quickly through a position, it may be represented by a light color or substantially transparent marker, on the other hand if a user spent a longer period of time in a single position, the associated position marker may be displayed in a darker color or substantially opaque appearance.

By way of continuing example the point of view markers may include point of view intensities associated therewith. As with the position intensities, the point of view intensities may be of variable opacities and/or colors which indicate a length of time that a user viewed an object. If a user viewed an object for a relatively short period of time the point of view intensity may be substantially transparent and/or light color. If the user viewed an object for a relatively long period of time the point of view intensity may be depicted in a substantially opaque and/or dark color.

Figure 8:
FIG. 8 is a depiction of an analytic viewer and associated features in accordance with one embodiment of the present invention.

With reference to FIG. 8, an analytics viewer 50 in accordance with one embodiment of the present invention is depicted therein. The analytics viewer 50 includes the architectural visualization 10 and presents the user with the ability to select one or more recorded metrics 51 comprising recorded metrics as described above to be overlaid on the architectural visualization 10. The user may select a single recorded viewing, or a plurality of recorded viewings to be overlaid. An average of a plurality of recorded viewings may also be overlaid. The analytic viewer 50 also presents one or more data threshold adjustments 52 in order to modify the appearance of position markers, point of view markers, position intensities, and point of view intensities to a user's preference.

Figure 9:
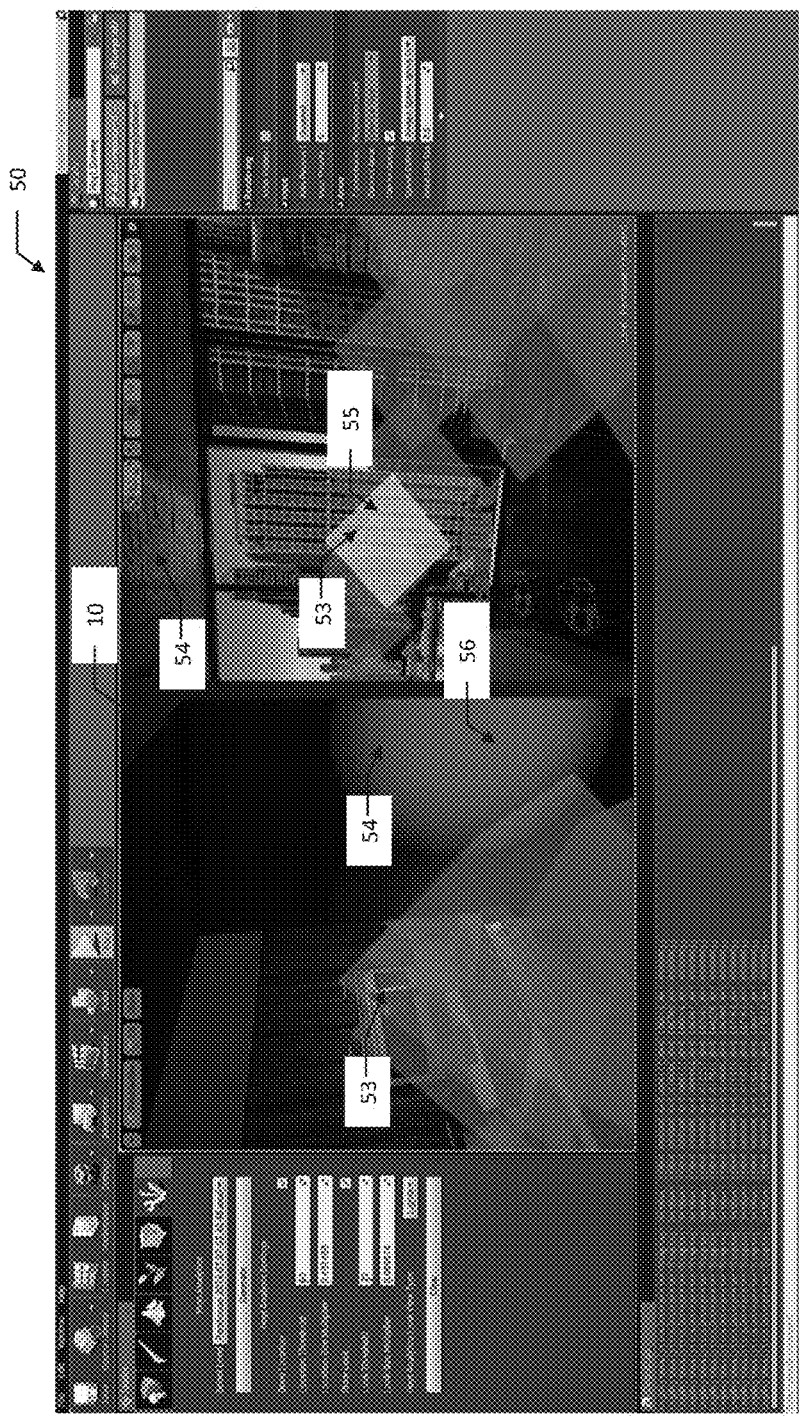
FIG. 9 is a depiction of an analytic viewer and associated features in accordance with one embodiment of the present invention.

Turning now to FIG. 9 the recorded metrics 51 have been overlaid within the architectural visualization 10 within the analytics viewer 50 comprising position markers 53, point of view markers 54, and associated position intensities 55 and point of view intensities 56. As such a user of the analytics viewer 50 may navigate the architectural visualization 10 and view the visual depictions of the recorded metrics 51 in order to understand and/or synthesize the collected data. As can be seen the position intensities 55 are depicted with reference to a color scale which may be adjusted via the data threshold adjustment, blue representing a lower time period of position data, green representing a longer time period of position data. The point of view intensities 56 are also depicted with reference to a color scale, green representing a lower time period of point of view data, red representing a longer time period of point of view data.

Figure 10:
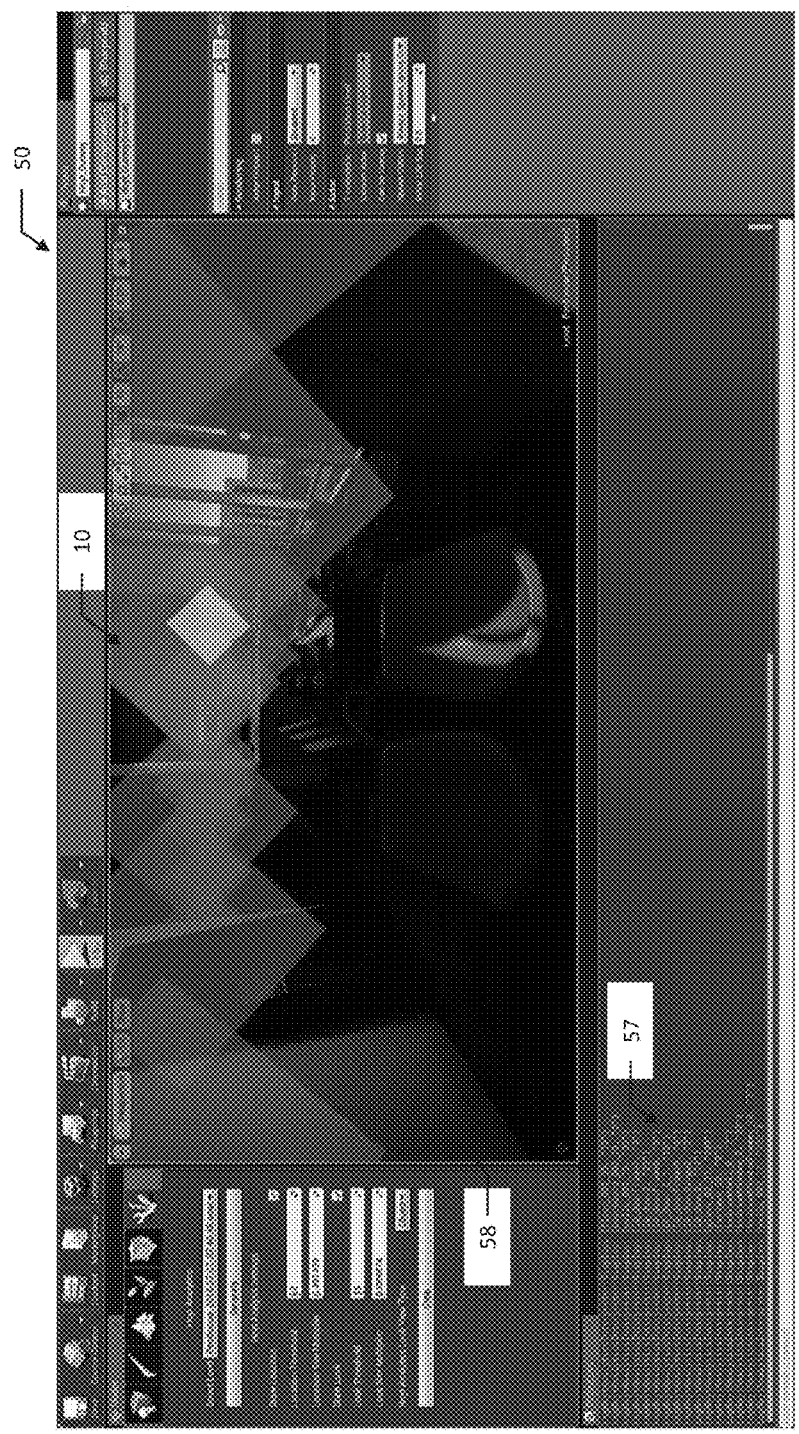
FIG. 10 is a depiction of an analytic viewer and associated features in accordance with one embodiment of the present invention.

Turning now to FIG. 10, an output log of recorded metrics 57 may be presented to a user of the analytic viewer 50. Such an output log 57 may comprise object identifiers and time periods associated with a user's viewing of the object. Additionally the architectural visualization may present with a reduced ambient light 58, lower than that which would be applicable to a viewing of the architectural visualization 10 itself, such that the position markers 53 and point of view of markers 54 may be more easily seen.

Figure 11:
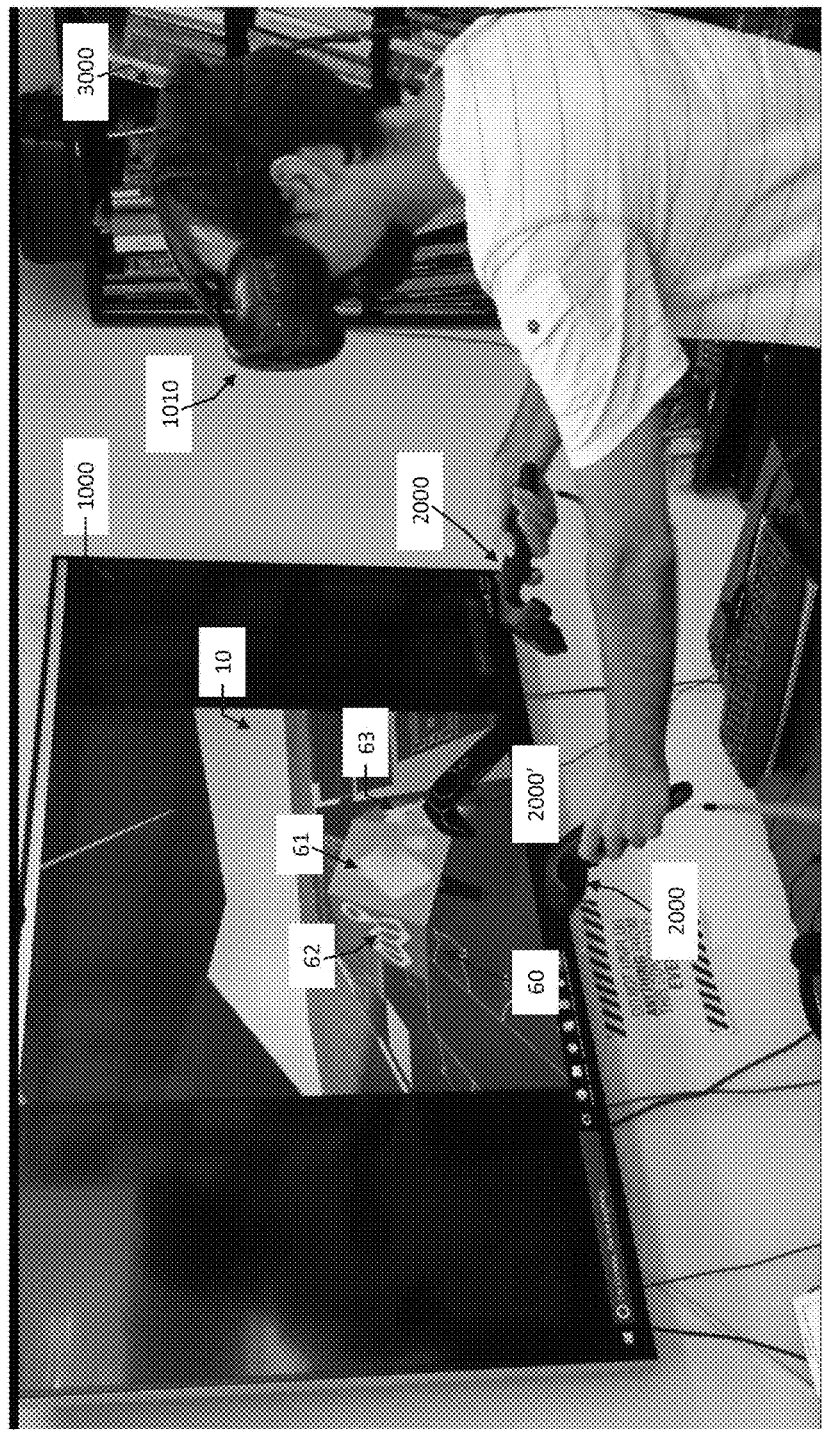
FIG. 11 is a depiction of various elements associated with an alternative embodiment of a method in accordance with the present invention.
Figure 12:
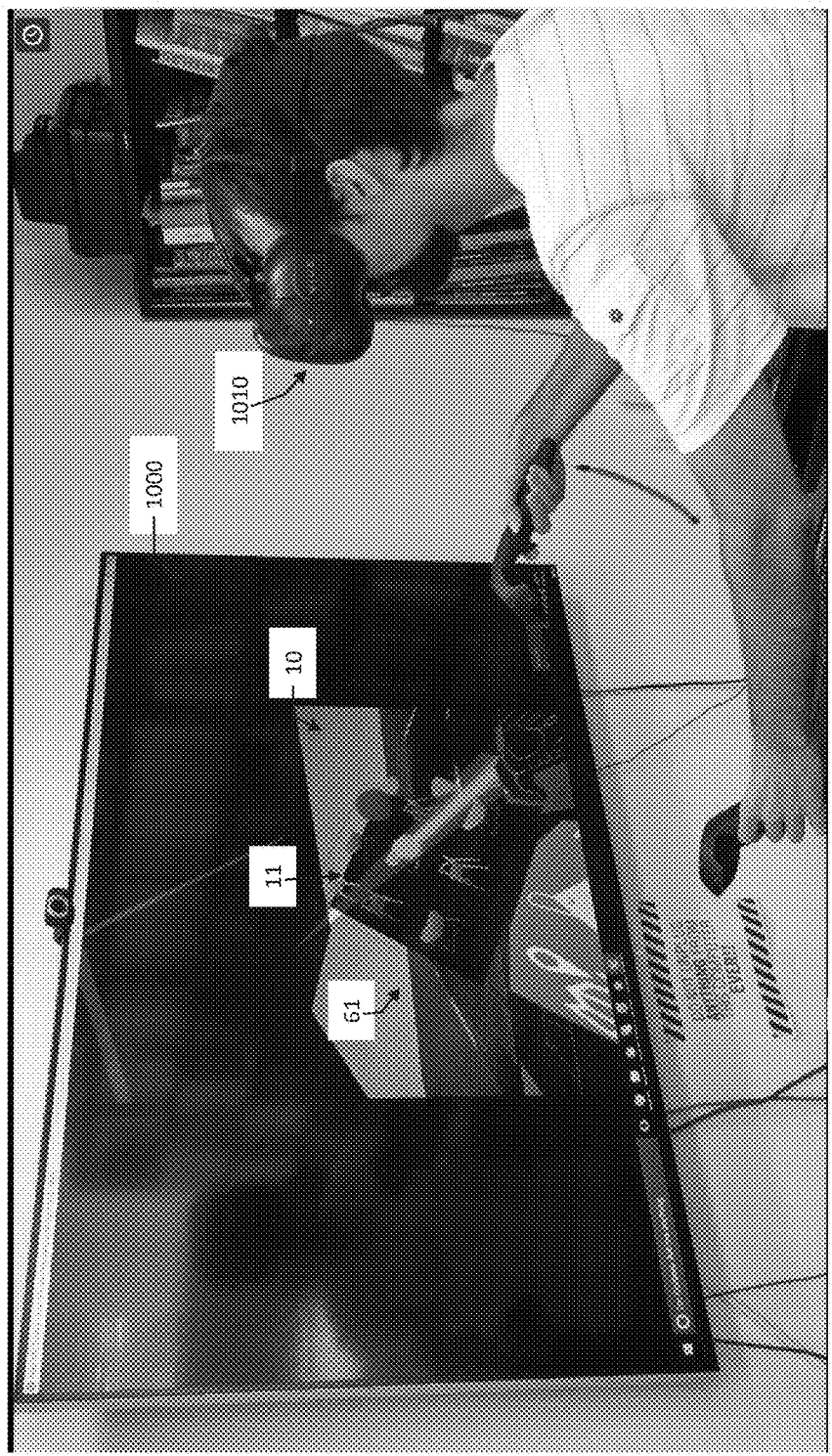
FIG. 12 is a depiction of various elements associated with an alternative embodiment of a method in accordance with the present invention.
Figure 13:
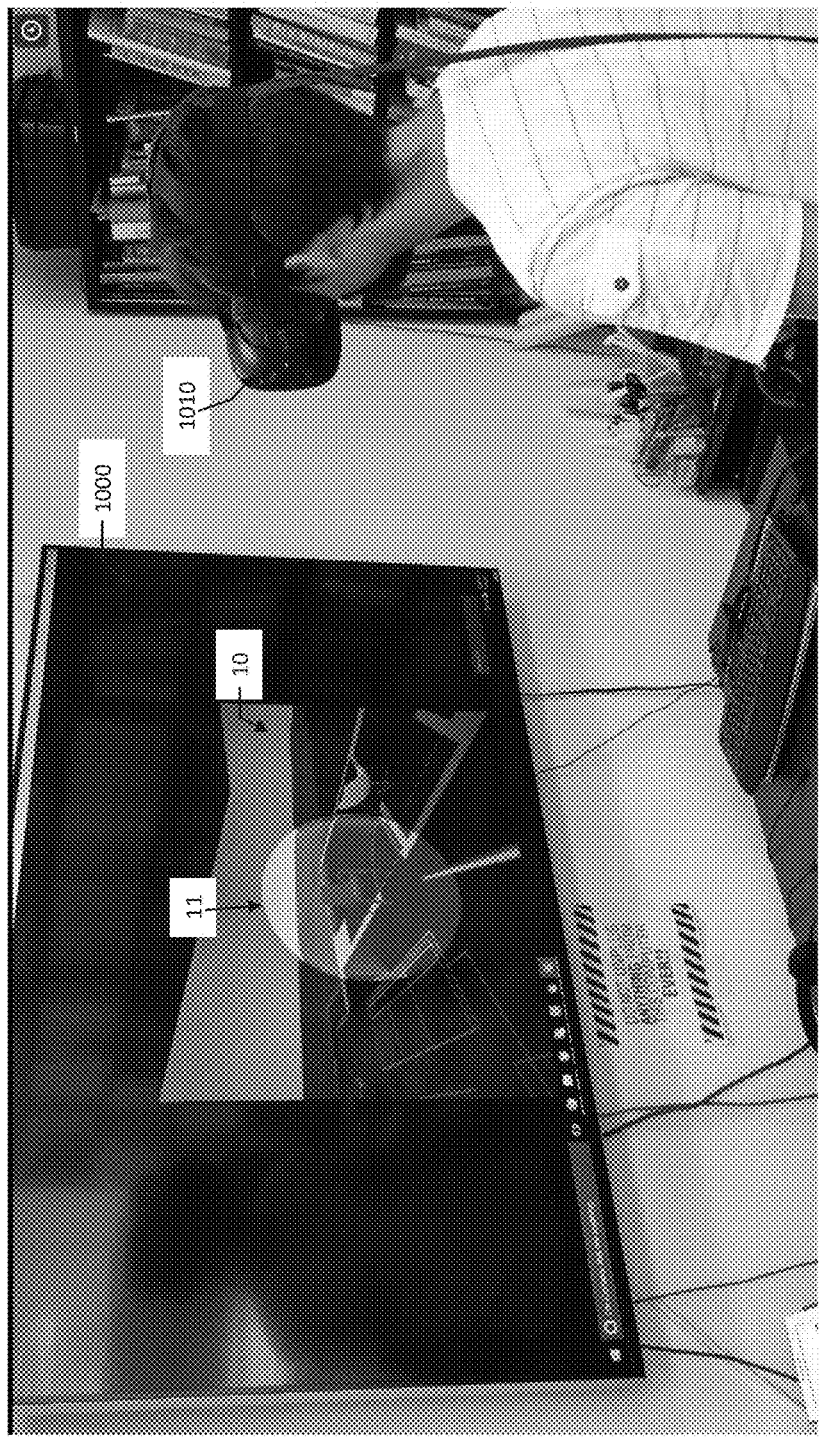
FIG. 13 is a depiction of various elements associated with an alternative embodiment of a method in accordance with the present invention.
Figure 14:
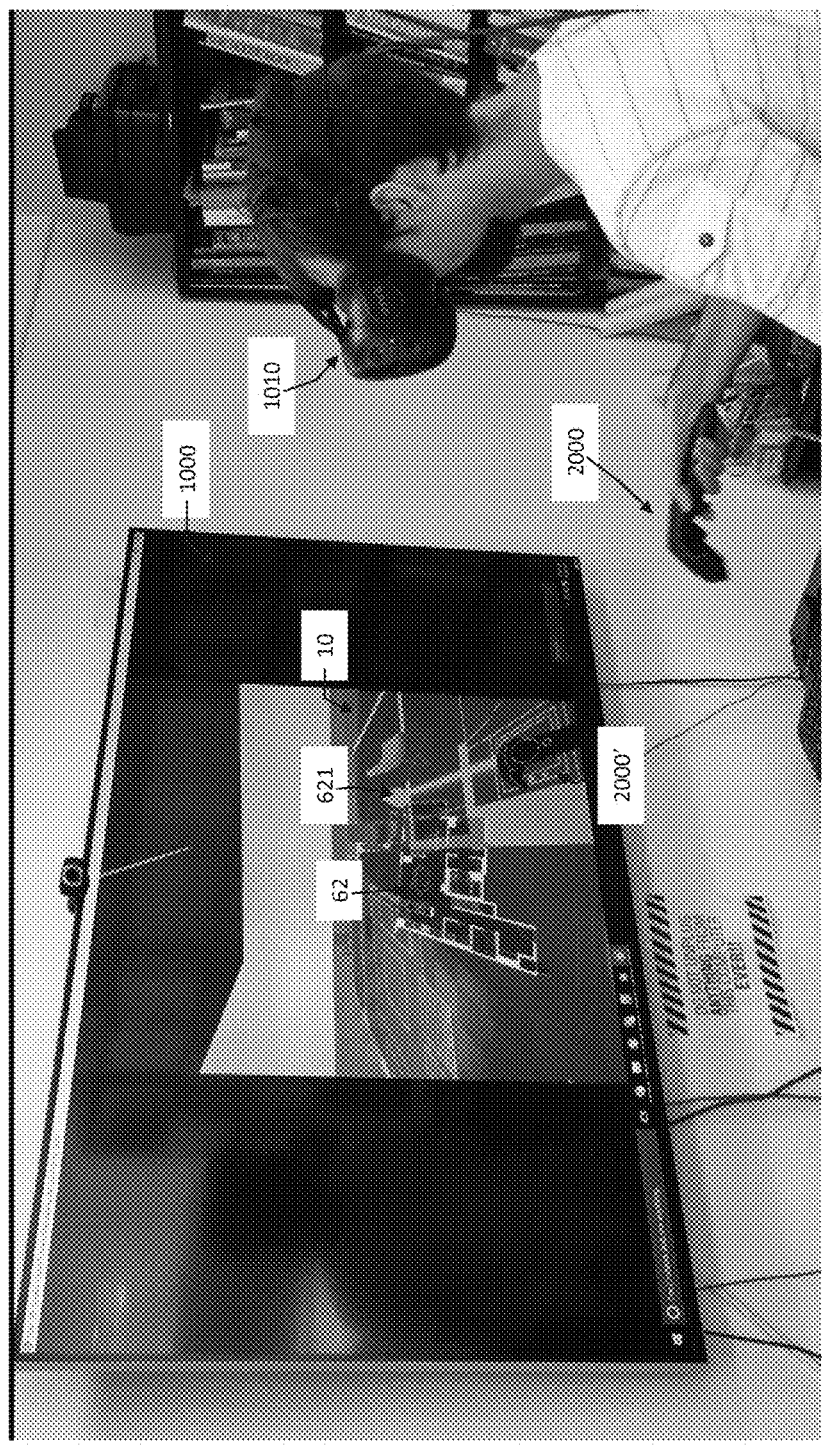
FIG. 14 is a depiction of various elements associated with an alternative embodiment of a method in accordance with the present invention.
Figure 15:
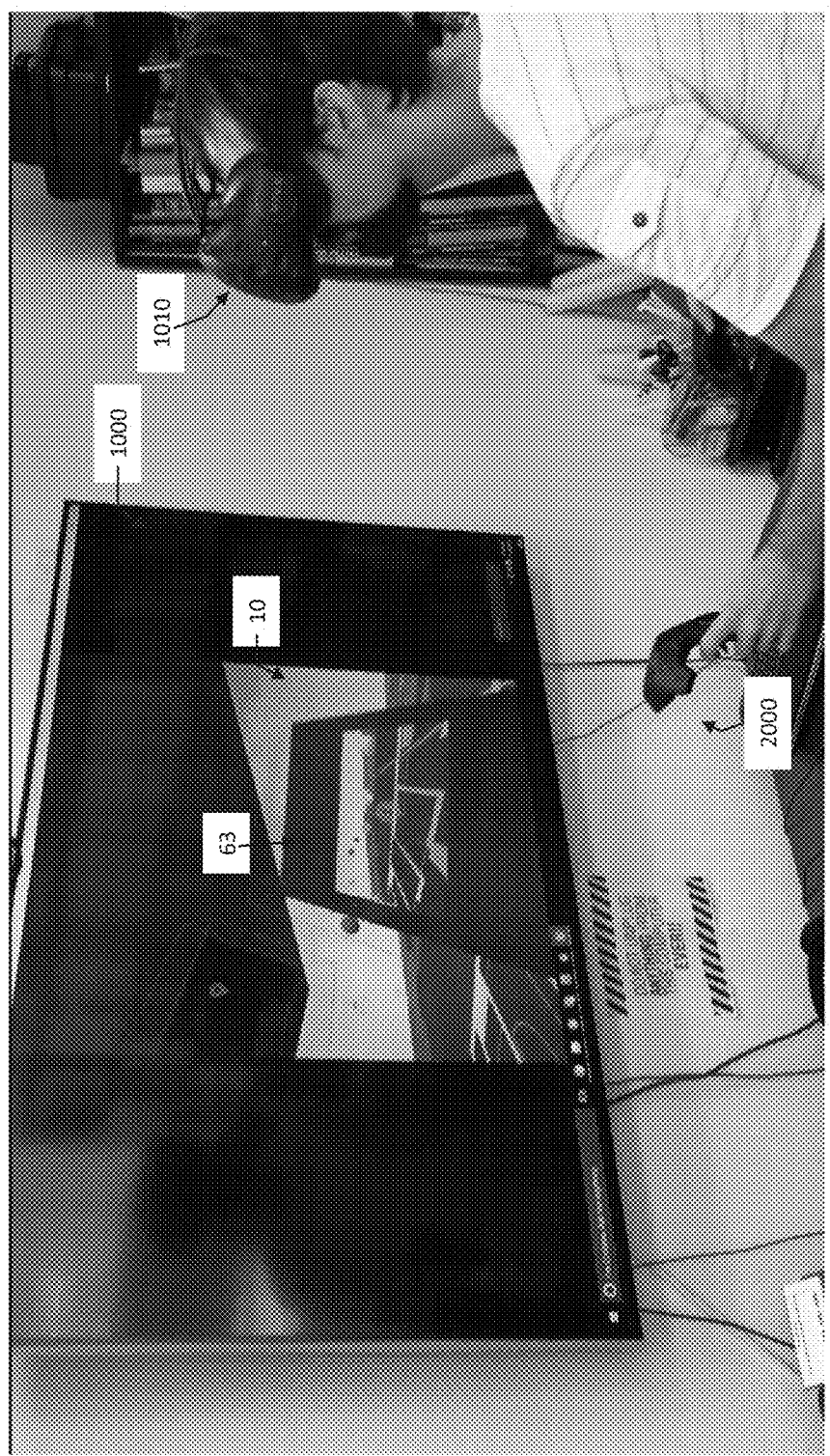
FIG. 15 is a depiction of various elements associated with an alternative embodiment of a method in accordance with the present invention.

FIG. 11 depicts various elements associated with an alternative embodiment of a method in accordance with the present invention. As depicted, a user 3000 is provided with a head-mounted display input device 1010 along with spatially tracked hand input devices 2000 in order to interact with the architectural visualization 10. For purposes of facilitating disclosure the display screen 1000 depicts the architectural visualization 10 as seen by the user 3000 via the head-mounted display input device 1010. It may also be useful in allowing others to view the architectural visualization 10 as the user 3000 navigates same. The spatially tracked hand input devices 2000 are associated with virtual depictions of the same referenced as 2000' throughout the drawings. As can be seen, one of the hand input devices 2000 is associated with interaction pallets 60 and the other of the hand input devices 2000 is utilized to make selections and otherwise interact with the architectural visualization 10. The interaction palettes 60 of the depicted embodiment incorporates an object palette 61, a map palette 62, and a camera palette 63. With specific reference to FIG. 12, the object palette may be selected in order to interact with objects indoor architectural elements 11 within the architectural visualization 10. As can be seen the user 3000 is utilizing one of the hand input devices 2000 to make a selection of architectural elements 11. Turning now to FIG. 13, it can be seen that the user 3000 is further utilizing one of the hand input devices 2000 to place a selected architectural element 11 within the architectural visualization 10. According to one embodiment of the present invention this may be accomplished via the forward projected vector ray cast from the corresponding hand input device 2000 which interacts with a collision mesh of the architectural elements 11 in order to confirm and/or represent to the user which of the specific architectural elements 11 is desired to be interacted with. Turning now to FIG. 14, the user is depicted interacting with a map pallet 62 of the present invention which is associated with one of the hand input devices 2000 while, the other hand input device is utilized to interact with the map palette 62, for example the user is utilizing the hand input device 2000 select a floorplan marker 621 in order to facilitate navigation of the architectural visualization 10. Now with reference to FIG. 15, the user has selected the camera palette 63 which enables a user to take still images of the architectural visualization 10. As can be seen the camera palette 63 is associated with one of the hand input devices 2000 which allows a user to manipulate the camera palette 63 and frame the still image that is desired to be taken. As described above such still images may be stored on a memory of a computer associated with the architectural visualization 10.

Figure 16:
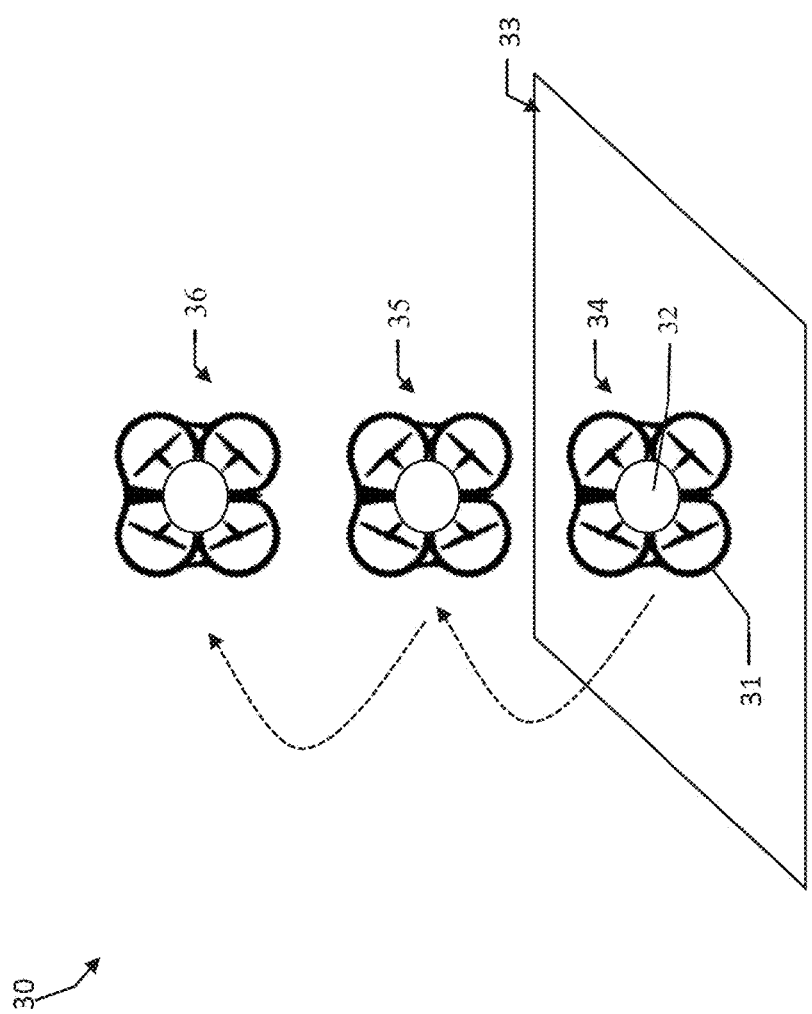
FIG. 16 is a schematic depiction of a method of generating background images in accordance with one embodiment of the present invention.
Figure 17:
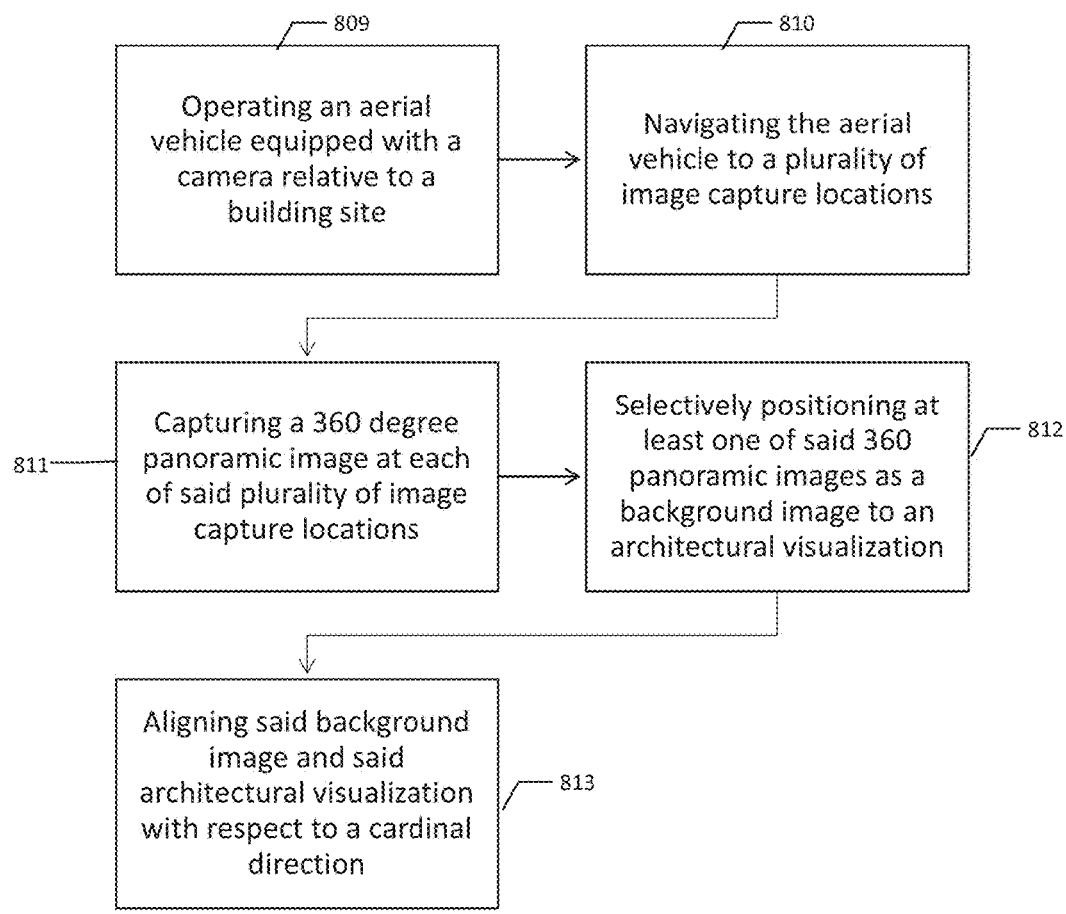
FIG. 17 is a flowchart depicting another method in accordance with one embodiment of the present invention.

FIGS. 16 and 17 are associated with methods and elements for capturing imagery for use as a background of an architectural visualization. Specifically with reference to FIG. 16, a schematic diagram of such a method according to one embodiment of the present invention is depicted therein. As can be seen, an aerial vehicle 31 is equipped with at least one camera 32 but also possibly a plurality of cameras disposed in assembly. The aerial vehicle is operated relative to the building site 33, such as a potential location upon which an architectural visualization is intended to represent. The aerial vehicle 31 is navigated to a first image capture location 34 relative to the building site 33 wherein a first image is captured via the camera 32. The aerial vehicle 31 is then navigated to a second image capture location relative to the building site 33 and another image is captured. The process is repeated until the nth or last image capture location 36 is reached wherein an nth or last image is captured.

Now with reference to FIG. 17 a flowchart in accordance with the method as depicted. Steps 809, 810, and 811 include the procedures of operating an aerial vehicle equipped with a camera relative to a building site, navigating the aerial vehicle to a plurality of image capture locations, and capturing an image of each of said plurality of image capture locations as set forth and described with reference to FIG. 16. The method also includes selectively positioning at least one of the images as a background image to an architectural visualization 812. This step may include importing such an image into software associated with the rendering of an architectural visualization. By way of example such a background is disclosed as reference numeral 13 in FIGS. 1 and 2. The method may also include aligning the background image and the architectural visualization with respect to a cardinal direction 813. Accordingly it may now be recognized that the foregoing procedure may be utilized to represent accurate views from an architectural visualization relative to a building site on which the architectural visualization may eventually be constructed. It will be appreciated that and accurate representation of views from such an architectural visualization may facilitate the accurate reproduction thereof for viewing and interacting by a user.

In a preferred embodiment of the method the aerial vehicle 31 and/or the camera 32 may be cooperatively disposed or operated so as to produce a 360 degree panoramic image at each of the capture locations. Furthermore each of the capture locations may correspond to a story or floor of a building to be constructed on the building site 33. As such user of an architectural visualization incorporating the method of generating background images of the president mention may be presented with a plurality of background images each associated with a particular floor of the building in which the architectural visualization represents. Additionally the 360 degree panoramic image provides for rotation of the view from various directions. By way of example, an architectural visualization may be pre-rendered with a background image depicting a view towards the southwest of the third floor of a building. A user may desire to experience the architectural visualization as if it were located in another area of the building such as facing the northeast. As such the background image may be rotated relative to the visualization to provide such a view. Additionally the user may desire to view the background image as if the architectural visualization represented another floor of the building. Accordingly the corresponding image from the corresponding capture location may be substituted.

Yet another aspect of the present invention comprises provision and use of a secondary display as generally depicted in FIGS. 18 and 19. Specifically such a secondary display 4000 may comprise a tablet computer upon which is installed requisite software to enable interaction with an architectural visualization 10 on a display screen 1000. For example the secondary display 4000 may be configured to communicate with a computer rendering an architectural visualization 10 in real time on the display screen 1000. The secondary display 4000 may be configured and operative to receive touch input and provide various functionality which may facilitate the selection, depiction, and viewing of various architectural visualizations 10 on a display screen 1000, by way of example, for use as a presentation mode by a sales agent in the context of presenting a proposed construction to a potential purchaser. Turning to FIG. 18, it can be seen that the secondary display 4000 includes various features which facilitate selection of a specific architectural visualization such as a unit sort input 4010, which allows selection of a unit by various features, as a non-limiting example. The secondary display may also be equipped with a control surface 4020 for manipulating the architectural visualization 10 in real time. Further inputs may be operative to adjust lighting and display other relevant information such as unit location within the architectural visualization 10, pricing information, amenities, features, street names, and the like. Turning to FIG. 19, the secondary display 4000 may further be configured to provide navigation controls 4040 for navigating within an architectural visualization 10 such as an interior view of a building construction in accordance with that set forth above. The secondary display 4000 may also provide controls 4030 to activate a head-mounted display depicting the architectural visualization 10 such as when a prospective purchaser desires to utilize same to view the architectural visualization and/or interact with it.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A method of producing and representing analytic data within a virtual architectural visualization comprising:
   providing an architectural visualization to a user;
   recording metrics comprising user position data and collision data relative to a forward projected vector ray cast from the user's position at predetermined intervals;
   importing the recorded metrics to an analytics viewer wherein the user position data and collision data is overlaid the architectural visualization via depiction of a plurality of position markers corresponding to said user position data and depiction of a plurality of point of view markers corresponding to a location of a collision between said forward projected vector ray and an object within the architectural visualization; and
   an intensity of said point of view marker corresponds with a length of time said forward projected vector ray collided with said object within the architectural visualization.

2. The method as recited in claim 1 wherein said predetermined interval is about one quarter of a second.

3. The method as recited in claim 1 wherein an intensity of said position marker corresponds with a length of time a user spends in said position.

* * * * *